(12) United States Patent
Kumar et al.

(10) Patent No.: US 12,477,498 B2
(45) Date of Patent: Nov. 18, 2025

(54) METHOD AND APPARATUS FOR ACQUIRING COMMUNICATION SERVICES

(71) Applicant: SAMSUNG ELECTRONICS CO., LTD., Suwon-si (KR)

(72) Inventors: Anikethan Ramakrishna Vijaya Kumar, Bangalore (IN); Kundan Tiwari, Bangalore (IN); Lalith Kumar, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 436 days.

(21) Appl. No.: 17/758,623

(22) PCT Filed: Jan. 13, 2021

(86) PCT No.: PCT/KR2021/000436
§ 371 (c)(1),
(2) Date: Jul. 11, 2022

(87) PCT Pub. No.: WO2021/145660
PCT Pub. Date: Jul. 22, 2021

(65) Prior Publication Data
US 2023/0048805 A1    Feb. 16, 2023

(30) Foreign Application Priority Data

Jan. 13, 2020  (IN) .......................... 202041001407
Jan. 7, 2021   (IN) .......................... 202041001407

(51) Int. Cl.
*H04W 60/04*    (2009.01)
*H04W 48/18*    (2009.01)
(52) U.S. Cl.
CPC ........... *H04W 60/04* (2013.01); *H04W 48/18* (2013.01)

(58) Field of Classification Search
CPC ..... H04W 80/04; H04W 88/06; H04W 88/08; H04W 84/18; H04W 60/04
(Continued)

(56) References Cited

U.S. PATENT DOCUMENTS 11,617,126 B2 *  3/2023  Choe ..................... H04W 48/20
                                                      370/328
11,751,045 B2 *  9/2023  Tamura ................. H04W 76/27
                                                      370/328
(Continued)

FOREIGN PATENT DOCUMENTS

WO   WO 2018/155934 A1 *  8/2018  ............ H04W 48/16
WO   WO 2018/206080 A1 * 11/2018  ............ H04W 48/18

OTHER PUBLICATIONS

3GPP TSG-SA WG2 Meeting #131, Santa Cruz, Tenerife, Spain, Feb. 25-Mar. 1, 2019, S2-1902421, Source: Intel, Title: CIoT of Enhanced Coverage, Release 16. (Year: 2019).*
(Continued)

*Primary Examiner* — Peter G Solinsky
*Assistant Examiner* — Sanjay K Dewan

(57) ABSTRACT

A method disclosed herein includes registering, by a UE, with a same PLMN over a 3GPP access and a non-3GPP access. The method includes receiving, by the UE, a notification message from a CN of the PLMN over the non-3GPP access, in response to at least one communication service pending to be delivered to the UE over the 3GPP access. The method includes sending, by the UE, a notification response message to the CN over the non-3GPP access, in response to the received notification message. In order to avoid delay in acquiring downlink communication services, the method includes triggering, by the UE, the registration procedure with the CN to receive communica-
(Continued)

tion services over the 3GPP access in response to the UE entering the coverage of the 3GPP access.

18 Claims, 5 Drawing Sheets

(58) Field of Classification Search
USPC .......................................................... 370/328
See application file for complete search history.

(56) References Cited

U.S. PATENT DOCUMENTS

| | | | | |
|---|---|---|---|---|
| 2018/0367980 | A1* | 12/2018 | Lee | H04L 67/51 |
| 2018/0376444 | A1* | 12/2018 | Kim | H04W 68/02 |
| 2019/0037448 | A1* | 1/2019 | Shan | H04W 60/04 |
| 2019/0059067 | A1* | 2/2019 | Lee | H04L 67/141 |
| 2019/0116546 | A1 | 4/2019 | Kang et al. | |
| 2019/0174449 | A1* | 6/2019 | Shan | H04W 60/04 |
| 2019/0394711 | A1* | 12/2019 | Kim | H04W 76/25 |
| 2021/0160809 | A1* | 5/2021 | Venkataraman | H04W 76/16 |
| 2021/0250890 | A1* | 8/2021 | Won | H04W 76/50 |
| 2022/0141902 | A1* | 5/2022 | Suresh Babu | H04L 41/0816 |
| | | | | 370/328 |
| 2023/0164877 | A1* | 5/2023 | Kim | H04W 76/22 |
| | | | | 370/328 |

OTHER PUBLICATIONS

International Search Report and Written Opinion of the International Searching Authority in connection with International Application No. PCT/KR2021/000436 issued Apr. 15, 2021, 7 pages.
Intellectual Property India, "Examination report under sections 12 & 13 of the Patents Act," issued Apr. 1, 2022, in connection with Indian Patent Application No. 202041001407, 6 pages.
3GPP TS 23.501 V16.3.0 (Dec. 2019); Technical Specification; 3rd Generation Partnership Project; Technical Specification Group Services and System Aspects; System architecture for the 5G System (5GS); Stage 2 (Release 16); 417 pages.
3GPP TS 24.501 V16.3.0 (Dec. 2019) Technical Specification; 3rd Generation Partnership Project; Technical Specification Group Core Network and Terminals; Non-Access-Stratum (NAS) protocol for 5G System (5GS); Stage 3 (Release 16); 643 pages.
"3rd Generation Partnership Project; Technical Specification Group Core Network and Terminals; Non-Access-Stratum (NAS) protocol for 5G System (5GS); Stage 3 (Release 16)", 3GPP TS 24.501 V16.3.0 (Dec. 2019), 645 pages.
Intel et al. "Procedures for CIoT Management of Enhanced Coverage", Change Request, 3GPP TSG-SA WG2 Meeting #131, Feb. 25-Mar. 1, 2019, S2-1902421, 32 pages.
Supplementary European Search Report dated Dec. 15, 2022 in connection with European Patent Application No. 21 74 1010, 11 pages.
Communication pursuant to Article 94(3) EPC dated Oct. 16, 2024, in connection with European Patent Application No. 21 741 010.9, 12 pages.

\* cited by examiner

METHOD AND APPARATUS FOR ACQUIRING COMMUNICATION SERVICES

CROSS-REFERENCE TO RELATED APPLICATIONS

This application is a 371 of International Application No. PCT/KR2021/000436, filed Jan. 13, 2021, which claims priority to Indian Patent Application No. 202041001407, filed Jan. 7, 2021, and Indian Patent Application No. 202041001407, filed Jan. 13, 2020, the disclosures of which are herein incorporated by reference in their entirety.

BACKGROUND

1. Field

The present disclosure relates to the field of wireless communication systems and more particularly to triggering a registration procedure by a user equipment (UE) in a wireless communication system to immediately receive communication services over 3rd generation partnership project (3GPP) access, on entering a coverage area of the 3GPP access.

2. Description of Related Art

Release 15 of 3GPP specification has introduced a feature where a network may avoid paging a UE over a 3GPP access, when the UE is registered on a same public land mobile network (PLMN) over the 3GPP access and a non-3GPP access for receiving communication services (for example; voice calls, data, or the like).

Consider an example scenario, as depicted in FIG. 1, where the UE registers on the same PLMN in a 5G system (5GS) over the 3GPP access and the non-3GPP access. The UE may lose a coverage of the 3GPP access, if a user of the UE moves to an area, where there is no service (for example: basement parking, during travel in remote areas, or the like). When the UE loses the coverage of the 3GPP access, a 5G core (5GC) network of the registered PLMN may receive the communication service (for example: incoming call, downlink data, or the like), which is pending to be delivered to the UE. In such a scenario, a 5G core access and mobility management function (AMF) of the 5GC initiates a notification procedure and sends a notification message to the UE over the non-3GPP access indicating pending downlink data or signaling for the UE over the 3GPP access, so that the UE may trigger a service request procedure over the 3GPP access and receive the communication service. However, as the UE is in no service over the 3GPP access, the UE may not be able to trigger the service request procedure over the 3GPP access. Thus, the UE sends a notification response message to the AMF indicating that the UE has lost the coverage of the 3GPP access.

On receiving the notification response message from the UE, the AMF indicates a 5G session management function (SMF) of the 5GC that the UE is not reachable for the current communication service. The AMF and SMF may start a timer till which the UE is marked as not reachable or permanently mark this UE as not reachable. The UE may enter into the coverage of the 3GPP access (for example: when the user comes back to ground floor from basement parking, or the like). Now, the SMF of the 5GC may receive the communication service to be delivered to the UE. However, as the UE is marked as not reachable, the SMF/AMF may not send the notification message or paging message to the UE. Thus, the communication service may be dropped by network, even though the UE is in the coverage of the 3GPP access and is capable of receiving the communication service. Such an issue may be resolved when one of the below events occur:

the UE initiates a mobile originating (MO) data or MO signaling. However, till the time the UE initiates the MO data/signaling, the UE is not be able to receive the downlink communication service (i.e., the incoming call or the data).

otherwise, the issue is resolved when the timer expires at the network (AMF/SMF) which was guarding the time till which the UE should remain marked as not reachable in network. Thus, there is a delay in UE acquiring the downlink communication service till one of the above mentioned events occur.

In addition, the notification procedure may have the following limitations:

Handling limited to specific sub-states of 5GMM registered on the 3GPP access: The notification procedure may be initiated by considering that the AMF has a UE context for both the 3GPP access and the non-3GPP access and the UE is in registered state on the 3GPP access if the UE is in a 5GMM-Connected mode on the non-3GPP access. However, such a consideration may not be true always. It may be possible that the UE has moved to a deregistered state on the 3GPP access but has not been able to notify the 5GC about the deregistered state, due to having been out of the coverage on both the 3GPP and the non-3GPP access at that point.

The notification procedure does not provide a way to notify the 5GC to stop reaching the UE via the 3GPP access until the UE enters to a coverage of the 3GPP access: The notification response message triggered by the UE indicates the SMF only that the UE is currently unreachable. However, if there is a trigger to deliver the communication service to the UE again, the SMF may re-attempt to reach the UE via the AMF, which may be redundant since the UE might not be reachable for a long time owing to network conditions. A handshake where the UE notifies the network via the non-3GPP access that the UE is no more reachable on the 3GPP access, thereby allowing the AMF to stop paging the UE on the 3GPP access and eventually the UE contacting the network once the UE is reachable, is missing.

SUMMARY

The embodiments herein is to disclose method and apparatus for enabling a UE to trigger a registration procedure to immediately acquire communication services, on entering into a coverage area of 3rd 3GPP access (i.e., a service area, or a normal service, or camped back on a cell of a registered area, or the like).

Accordingly, the embodiments herein provide method and apparatus for triggering a registration procedure to receive communication services. A method disclosed herein includes registering, by a UE, with a same PLMN over a 3GPP access and a non-3GPP access. The method further includes losing, by the UE, a coverage of the 3GPP access. The method further includes receiving, by the UE, a notification message from a core network of the PLMN over the non-3GPP access, in response to at least one communication service pending to be delivered to the UE over the 3GPP access. The method further includes sending, by the UE, a notification response message to the core network over the non-3GPP access indicating failure to initiate a non-access stratum (NAS) procedure over the 3GPP access, in response to the received notification message. The method further includes triggering, by the UE, the registration procedure with the core network to receive the communication services over the 3GPP access in response to the UE entering the coverage of the 3GPP access.

Accordingly, the embodiments herein provide a UE in a wireless communication system configured to trigger a registration procedure to receive communication services. The UE registers with a same PLMN over a 3GPP access and a non-3GPP access. The UE loses a coverage of 3GPP access. The UE receives a notification message from a core network of the PLMN over the non-3GPP access, in response to at least one communication service pending to be delivered to the UE over the 3GPP access. The UE sends a notification response message to the core network over the non-3GPP access indicating failure to initiate a NAS procedure over the 3GPP access, in response to the received notification message. The UE triggers the registration procedure with the core network to receive the communication services over the 3GPP access in response to the LTE entering the coverage of the 3GPP access.

These and other aspects of the example embodiments herein will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made within the scope of the example embodiments herein without departing from the spirit thereof, and the example embodiments herein include all such modifications.

BRIEF DESCRIPTION OF THE DRAWINGS

Embodiments herein are illustrated in the accompanying drawings, throughout which like reference letters indicate corresponding parts in the various figures. The embodiments herein will be better understood from the following description with reference to the drawings, in which.

DETAILED DESCRIPTION

Figure 1:
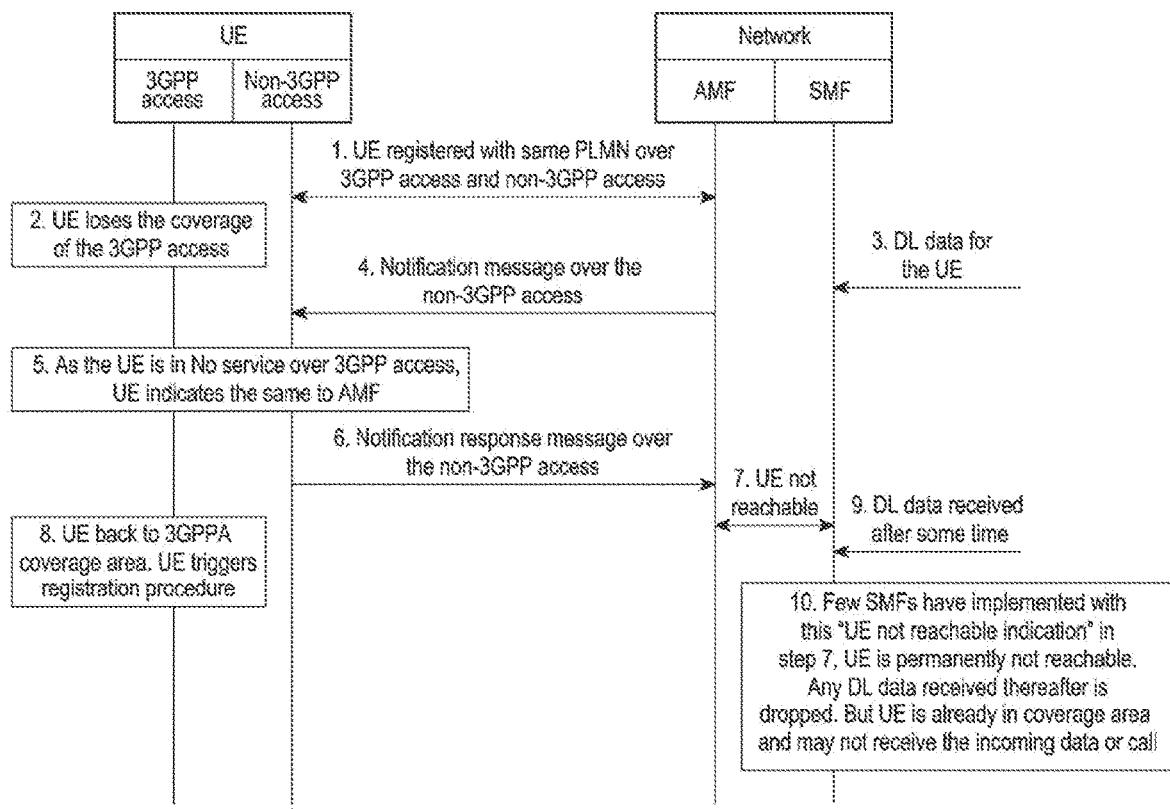
FIG. 1 is a sequence diagram depicting an example conventional approach of providing communication services to a UE registered with a same PLMN over a 3rd 3GPP access and a non-3GPP access in which there is a delay in acquiring the communication services by the UE.

In order to facilitate better understanding of the technical solutions of the embodiments by those skilled in the art, the technical solutions of the embodiments will be described clearly and completely hereinafter in conjunction with the drawings accompanying the embodiments.

Some processes described in the description, claims and the drawings may comprise a plurality of operations that are described in a certain order. However, it should be understood that these operations may be executed in an order rather than the order in which they are described herein or executed in parallel. The reference numbers indicating the operations, such as 101 and 102, are merely used for distinguishing different operations, and the reference numbers themselves do not represent any execution order. In addition, these processes may comprise more or less operations, and these operations may be executed sequentially or in parallel. It is to be noted that the word such as "first" and "second" are used for distinguishing different messages, devices, modules or the like, which neither indicate any sequences nor define different types.

Technical solutions of the embodiments will be explained clearly and completely hereinafter in conjunction with the accompanying drawings. Obviously, the embodiments described herein are only some of rather than all of the embodiments of the present disclosure. Any other embodiments obtained by those skilled in the art based on the embodiments without any creative work will fall into the protection scope of the present disclosure.

Each block of the flowchart illustrations, and combinations of blocks in the flowchart illustrations, can be implemented by computer program instructions. The computer program instructions can be provided to a processor of a general purpose computer, special purpose computer, or other programmable data processing apparatus to produce a machine, such that the instructions, which execute via the processor of the computer or other programmable data processing apparatus, implement the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instructions that implement the function specified in the flowchart block or blocks. The computer program instructions may also be loaded onto a computer or other programmable data processing apparatus to cause a series of operational steps to be performed on the computer or other programmable apparatus to produce a computer implemented process, such that the instructions that execute on the computer or other programmable apparatus provide steps for implementing the functions specified in the flowchart block or blocks.

Each block of the flowchart illustrations may represent a module, segment, or portion of code, which includes one or more executable instructions for implementing the specified logical function(s). In some alternative implementations, the functions noted in the blocks may occur in a different order. For example, two blocks illustrated in succession may in fact be executed substantially concurrently or the blocks may sometimes be executed in the reverse order, depending upon the functionality involved.

Herein, the term "unit" may indicate a software or hardware component, such as a field-programmable gate array (FPGA) or an application specific integrated circuit (ASIC), and a "unit" performs any function. However, a "unit" or "module" is not limited to software or hardware. A "unit" or "module" may be constructed either to be stored in an addressable storage medium or to execute one or more processors. Therefore, a "unit" or "module" may include, e.g., software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by a "unit" or "module" may be either combined into a smaller number of elements, "units", or "modules" or divided into a larger number of elements, "units", or "modules". The elements, "units" and/or "modules" may be implemented to reproduce one or more central processing units (CPUs) within a device or a security multimedia card.

Although embodiments of the present disclosure are described below with reference to an 3GPP-based radio communication system, the present disclosure is also applicable to other communication systems and services having similar technical backgrounds.

Embodiments herein enable a User Equipment registered with a same PLMN over a 3rd 3GPP access and a non-3GPP access to trigger a registration procedure to receive communication services. The registration procedure is triggered by the UE, if the UE has sent a notification response message to a network over the non-3GPP access in response to a notification message received from the network and the UE enters into a coverage of the 3GPP access, wherein the UE receives the notification message from the network when the at least one communication service is pending to be delivered to the UE.

Referring now to the drawings, and more particularly to FIGS. 2 through 7, where similar reference characters denote corresponding features consistently throughout the figures, there are shown example embodiments.

Figure 2:
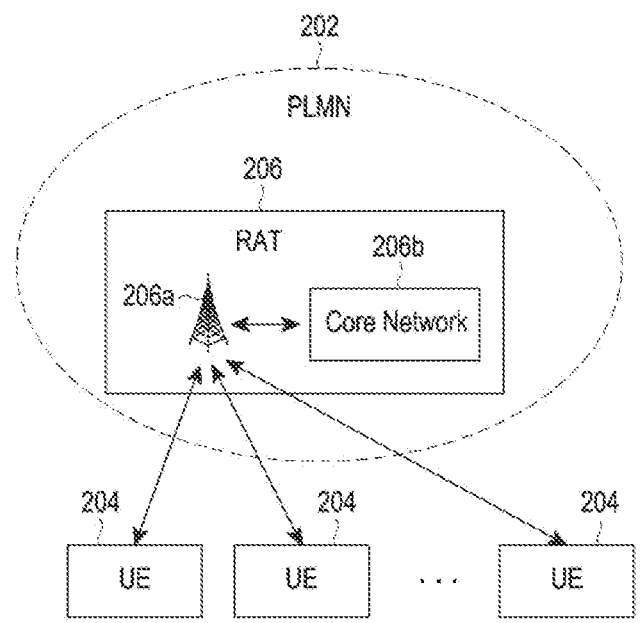
FIG. 2 depicts a wireless communication system, according to embodiments as disclosed herein.

FIG. 2 depicts a wireless communication system, according to embodiments as disclosed herein. The wireless communication system includes a PLMN 202 and one or more UEs 204.

The PLMN 202 may be configured to provide communication services to the one or more UEs 204 in a specific region. Examples of the communication services may be, but are not limited to, voice calls, downlink data, a streaming service (streaming of multimedia data such as audio, video, text and so on), a file download service, a carousel service (a service for combining file download service and streaming service), a television (TV) service, an internet protocol (IP) multimedia subsystem (IMS) service, a short messaging service, a multimedia messaging service (MMS), and so on.

The PLMN 202 includes one or more different public cellular networks/RATs 206 such as, but are not limited to, a new radio (NR)/5G network/5G system (5GS), a long term evolution (LTE) network, an advanced LTE network, a narrowband internet of things (NB-IoT), a universal mobile telecommunications service (UMTS), a global system for mobile communications (GSM) enhanced data rates for GSM evolution (EDGE) radio access network (GERAN) system or any other next generation networks. The RAT 206 includes a plurality of radio access networks (RANs) 206a, and at least one core network (CN) 206b. The RAN 206a and the CN 206b may comprise of one or more processors/central processing units (CPUs), a memory, a storage, a transceiver, and so on, for performing at least one intended function/operation.

The RAN 206a may comprise of nodes/base stations (BSs) such as, but are not limited to, evolved nodes (eNBs), new radio nodes (gNBs), a new radio access network supporting both an eNB, and a gNB, and so on. The RAN 206a may connect the one or more UEs 204 to the at least one CN 206b. The RAN 206a may be configured to perform radio resource management functions such as, but are not limited to, radio bearer control, radio admission control, connection mobility control, dynamic allocation of resources to the UE in uplink/downlink (scheduling), and so on.

The CN 206b referred herein may be at least one of an evolved packet core (EPC), a 5G core (5GC) network, or the like. The CN 206b may be connected to the RAN 206a and an external data network. Examples of the external data network may be, but are not limited to, the Internet, a packet data network (PDN), an internet protocol (IP) multimedia core network subsystem, and so on. The CN 206b may connect with the one or more UEs 204 through the associated RAN(s) 206a. The CN 206b may connect the one or more UEs 204 to the external data network for the communication services. In an example, the PLMN 202 includes a 5G system (5GS), which includes one or more gNBs/RANs 206a connected to the 5GC/CN 206b.

The UE(s) 204 may be a user device that is capable of supporting the PLMN 202. Examples of the UE 204 may be, but are not limited to, a mobile phone, a smartphone, a tablet, a phablet, a personal digital assistant (PDA), a laptop, a computer, a wearable computing device, a vehicle infotainment device, an internet of things (IoT) device, a virtual reality (VR) device, a wireless fidelity (Wi-Fi) router, a USB dongle, a robot, an auto-guided vehicle, and or any other device that may register with the PLMN 202 for receiving the one or more communication services.

In an embodiment, the UE 204 registers with the same PLMN 202 over a 3GPP access and a non-3GPP access for receiving the communication services. The 3GPP access/3GPP access network may be a radio access network defined by the 3GPP specification. The 3GPP access incudes at least one of, but is not limited to, NR/5G network, Evolved-UMTS (universal mobile telecommunications service) terrestrial radio access network (E-UTRAN), GSM (global system for mobile communications) EDGE radio access network (GERAN), UNITS terrestrial radio access network (UTRAN) or any other network/next generation network defined by the 3GPP specification. The E-UTRAN includes LTE and LTE-Advanced. The GERAN may be a radio access network of GSM/GPRS (general packet radio service)). The UTRAN may be a radio access network of UMTS based technologies such as, wideband code division multiple access (WCDMA), high speed packet access (HSPA), or the like. The non-3GPP access may be an access network that has not be defined by the 3GPP specification. The non-3GPP access includes at least one of, but is not limited to, Wi-Fi, worldwide interoperability for microwave access (WiMAX), local access network (LAN), wireless lAN (WLAN), or any other fixed network. The UE 204 may register with the same PLMN 202 over the 3GPP access and the non-3GPP access, as defined in Release 15 of the 3GPP specification.

The UE 204 may lose a coverage of the 3GPP access, when the UE 204 is located in a region/area, where there is no service of the 3GPP access (i.e., the UE 204 does not camp on any cells of the 3GPP access). In an example, the UE 204 may lose the coverage of the 3GPP access, when a user of the UE 204/UE 204 moves to a basement parking, during a travel in remote areas, and so on. Thus, when the UE 204 loses the coverage of the 3GPP access, the UE 204 may be in a connected state with the PLMN 202 over the non-3GPP access and not reachable via the 3GPP access.

When the UE 204 loses the coverage of the 3GPP access, the UE 204 receives a notification message from the CN 206b of the PLMN 202 over the non-3GPP access, in response to the one or more communication services pending to be delivered to the UE 204 over the 3GPP access. The notification message may indicate the UE 204 about the pending delivery of the one or more communication services to be received over the 3GPP access.

On receiving the notification message from the CN 206b, the UE 204 sends a notification response message to the CN 206b over the non-3GPP access. The notification response message indicates the CN 206b about a failure of the UE 204 to initiate a NAS procedure with the CN 206b over the 3GPP access, as the UE 204 is in no service area (for example: the UE 204 is either in a 5GMM-REGISTERED.NO-CELL-AVAILABLE state or 5GMM-REGISTERED.PLMN-SEARCH state performing a PLMN search or due to some other reasons the UE 204 is not able to initiate NAS procedure over the 3GPP access.

In an embodiment, the UE 204 triggers a registration procedure with the CN 206b to receive the communication services over the 3GPP access, when the UE 204 enters into the coverage/coverage area of the 3GPP access and if the UE 204 had sent the notification response message to the CN 206b earlier. Entering into the coverage of the 3GPP access by the UE 204 refers to camping by the UE 204 on the suitable cells of the 3GPP access (for example; i.e., when the UE 204 enters into a 5GMM-REGISTERED.NORMAL-SERVICE state). The UE 204 triggers the registration procedure to send a registration request message to the CN 206b over the 3GPP access. The registration request message indicates the CN 206b that the UE 204 is in the coverage of the 3GPP access.

On receiving the registration request message from the UE 204, the CN 206b deletes a "UE not reachable flag" if the CN 206b had set the "UE not reachable flag". The "UE not reachable flag" indicates whether the UE 204 is in the coverage of the 3GPP access or not. The CN 206b may have set the "UE not reachable flag", after receiving the notification response message from the LIE 204 over the non-3GPP access. After deleting the "UE not reachable flag", the CN 206b delivers the one or more communication services to the UE 204 over the 3GPP access. Thus, the UE 204 may receive the communication services over the 3GPP access, as soon as entering into the coverage area of the 3GPP access.

In an embodiment herein, the notification message, the NAS procedure, the notification response message, and the registration request message may be intuitively inferred by one of ordinary skill in the art based on the respective definitions/details provided in the 3GPP specification, and thus, detailed description of each is omitted herein.

FIG. 2 depicts exemplary units/components of the wireless communication system, but it is to be understood that other embodiments are not limited thereon. In other embodiments, the wireless communication system may include less or a greater number of units. Further, the labels or names of the units are used only for illustrative purpose and does not limit the scope of the embodiments herein. One or more units can be combined together to perform same or substantially similar function in the wireless communication system.

Figure 3:
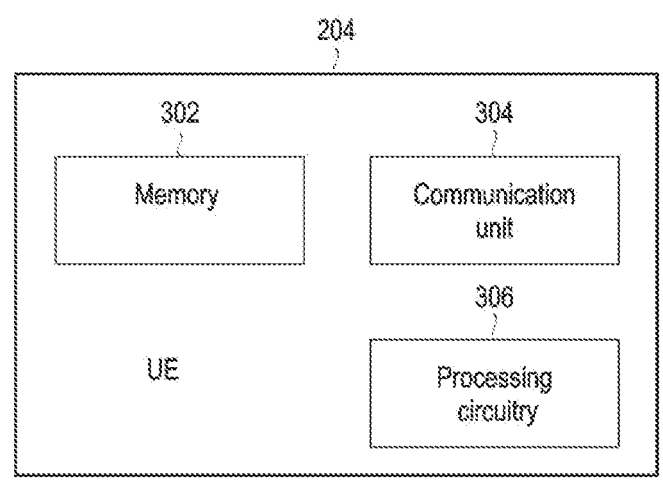
FIG. 3 is an example block diagram depicting various components of a UE for triggering the registration procedure to receive communication services, according to embodiments as disclosed herein.

FIG. 3 is an example block diagram depicting various components of the UE 204 for triggering the registration procedure to receive the communication services, according to embodiments as disclosed herein.

The UE 204 includes a memory 302, a communication interface 304, and a processing circuitry 306. The UE 204 may also include components such as, but are not limited to, an antenna, a transceiver, a signal processing circuitry, a display, and so on (not shown).

The memory 302 may store at least one of, information about the registered PLMN 202, status of protocol data unit (PDU) sessions established with the CN 206b of the PLMN 202, and so on. The memory 302 may also include a registration procedure initiator 400, that may be executed on the processing circuitry 306 to trigger the registration procedure. Examples of the memory 302 may be, but are not limited to, NAND, embedded multimedia card (eMMC), secure digital (SD) cards, universal serial bus (USB), serial advanced technology attachment (SATA), solid-state drive (SSD), and so on. Further, the memory 302 may include one or more computer-readable storage media. The memory 302 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 302 may, in some examples, be considered a non-transitory storage medium. The term "non-transitory" may indicate that the storage medium is not embodied in a carrier wave or a propagated signal. However, the term "non-transitory" should not be interpreted to mean that the memory 302 is non-movable. In certain examples, a non-transitory storage medium may store data that can, over time, change (e.g., in random access memory (RAM) or cache).

The communication unit 304 may be configured to enable the UE 204 to connect with the PLMN 202 over the 3GPP access and the non-3GPP access.

The processing circuitry 306 may be at least one of a single processor, a plurality of processors, multiple homogeneous or heterogeneous cores, multiple central processing units (CPUs) of different kinds, microcontrollers, special media, and other accelerators. The processing circuity 306 may be configured to execute the registration procedure initiator 400 to trigger the registration procedure with the CN 206b for receiving the communication services.

Figure 4:
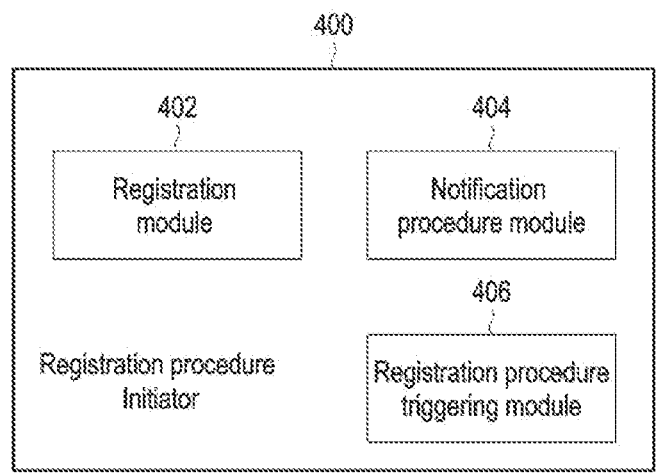
FIG. 4 depicts a registration procedure initiator performable on the UE, according to embodiments as disclosed herein.

As depicted in FIG. 4, the registration procedure initiator 400 includes a registration module 402, a notification procedure module 404, and a registration procedure triggering module 406.

The registration module 402 may be configured to enable the UE 204 to register with the same PLMN 202 over the 3GPP access and the non-3GPP access, according to the Release 15 of the 3GPP specification.

The notification procedure module 404 may be configured to receive the notification message from the CN 206b over the non-3GPP access, when the one or more communication services may be pending to be delivered to the UE 204 over the 3GPP access. The notification procedure module 404 may be further configured to send the notification response message to the CN 206b over the non-3GPP access, in response to the received notification message from the CN 206b. The notification response message indicates the CN 206b about the failure of the UE 204 to initiate the NAS procedure with the CN 206b over the 3GPP access, as the UE 204 has lost the coverage of the 3GPP access or any other reasons.

The registration procedure triggering module 406 may be configured to trigger the registration procedure for receiving the communication services. In an embodiment, the registration procedure triggering module 406 may trigger the registration procedure, if the UE 204 has sent the notification response message to the CN 206b over the non-3GPP access in response to the notification message received from the CN 206b over the non-3GPP access and the UE 204 camps onto the suitable cells of the 3GPP access (i.e., entering into the coverage of the 3GPP access). Triggering the registration procedure (or any other NAS procedure like a service request and so on) includes sending the registration request message or respective NAS procedure message like a service request to the CN 206b indicating that the UE 204 is in the coverage of the 3GPP access. On receiving the registration request (or a NAS message) message from the UE 204, the CN 206b enables the UE 204 to receive the subsequent communication services. Thus, the communication services may not be dropped/missed by the UE 204 over the 3GPP access when the UE 204 is in the coverage of the 3GPP access.

FIGS. 3 and 4 depict exemplary units/components of the UE 204, but it is to be understood that other embodiments are not limited thereon. In other embodiments, the UE 204 may include less or a greater number of units. Further, the labels or names of the units are used only for illustrative purpose and does not limit the scope of the embodiments herein. One or more units can be combined together to perform same or substantially similar function in the UE 204.

Figure 5:
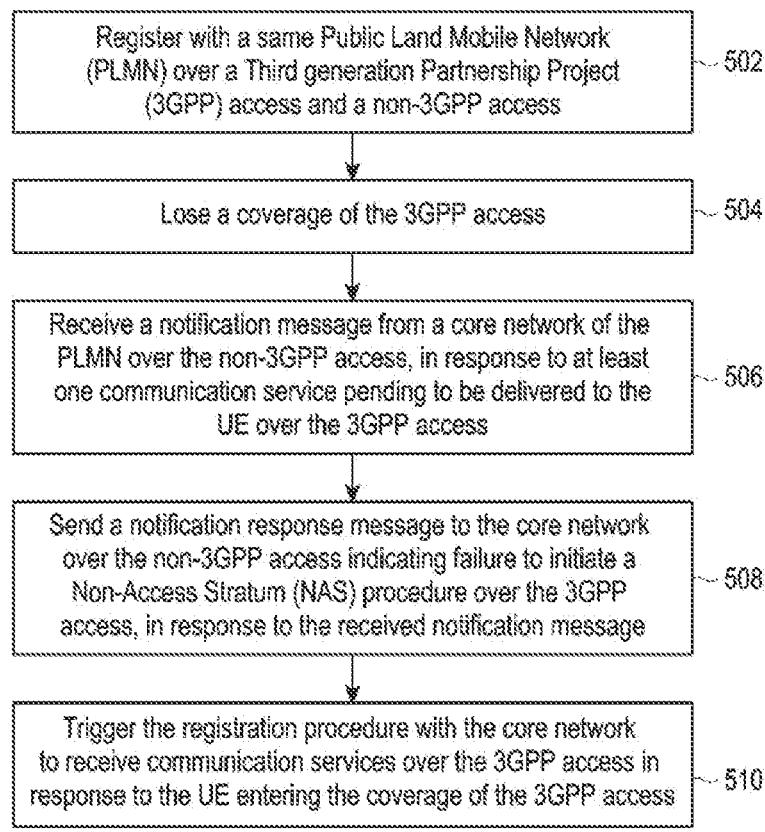
FIG. 5 is a flow diagram depicting a method for triggering the registration procedure by the UE to receive the communication services, according to embodiments as disclosed herein.

FIG. 5 is a flow diagram depicting a method for triggering the registration procedure by the UE 204 to receive the communication services, according to embodiments as disclosed herein.

At step 502, the method includes registering, by the UE 204, with the same PLMN 202 over the 3GPP access and the non-3GPP access. At step 504, the method includes losing, by the UE 204, the coverage of the 3GPP access, as the UE 204 is not in service area or the UE 204 is performing a PLMN search or the UE 204 is performing similar operation.

At step 506, the method includes receiving, by the UE 204, the notification message from the CN 206b of the PLMN 202 over the non-3GPP access, in response to the at least one communication service pending to be delivered to the UE 204 over the 3GPP access. At step 508, the method includes sending, by the UE 204, the notification response message to the CN 206b over the non-3GPP access indicating the failure to initiate the NAS procedure over the 3GPP access, in response to the received notification message.

At step 510, the method includes triggering, by the UE 204, the registration procedure with the CN 206b to receive the communication services over the 3GPP access in response to the UE, entering the coverage of the 3GPP access. Triggering the registration procedure includes sending, by the UE 204, the registration request message to the CN 206b over the 3GPP access. The registration request message indicates the CN 206b that the UE is in the coverage of the 3GPP access. On receiving the registration request message from the UE 204, the CN 206b deletes the "UE not reachable flag" if the CN 206b had set the "UE not reachable flag" and enables the UE 204 to receive the communication services. The various actions in method for triggering the registration procedure may be performed in the order presented, in a different order or simultaneously. Further, in some embodiments, some actions listed in FIG. 5 may be omitted.

Embodiments herein further explain the registration procedure by considering that the PLMN 202 includes a 5GS 206 as an example RAT 206, but it may be obvious to a person skilled in the art that any other RAT may be considered. The 5GS 206 includes a 5GC network 206b, wherein the 5GC 206b includes functional modules such as, but are not limited to, a 5G core access and mobility management function (AMF) 602, a 5G session management function (SMF) 604, or the like, for managing delivery of the one or more communication services to the UE 204.

Further, for managing registration status of the UE 204a with the 5GC 206b of the PLMN over the 3GPP access/non-3GPP access, the UE 204 and the 5GC 206b may use two states; a de-registered state (RM-DEREGISTERED/5GMM-DEREGISTERED state) and a registered state (RM-REGISTERED/5GMM-REGISTERED state). For connection management between the UE 204a and the 5GC 206b of the PLMN 202 over the 3GPP access/non-3GPP access, the UE 204a and the 5GC 206b may use two connection management states; an idle state (CM-IDLE/5GMM-IDLE state) state and a connected state (CM-CONNECTED/5GMM-CONNECTED state). In the idle state, the UE 204 may be in the registered state without having the NAS signaling connection established with the CN 206b. In the connected state, the UE 204 establishes the NAS signaling/procedure with the CN 206b over the 3GPP access/non-3GPP access.

Figure 6:
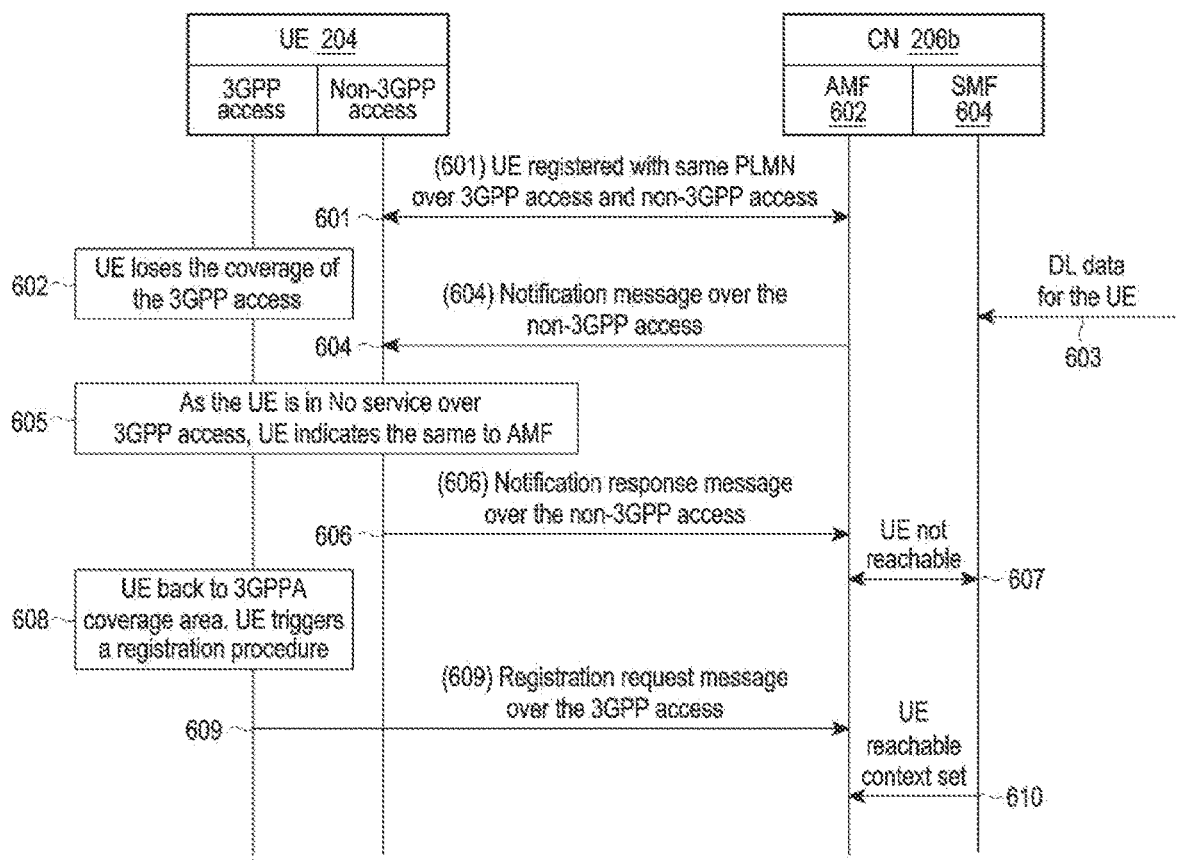
FIG. 6 is an example sequence diagram depicting the registration procedure triggered by the UE to receive the communication services, according to embodiments as disclosed herein.

FIG. 6 is an example sequence diagram depicting the registration procedure triggered by the UE 204 to receive the communication services, according to embodiments as disclosed herein.

As depicted in FIG. 6, at step 601, the UE 204 registers with the same PLMN including the 5GS 206 over the 3GPP access and the non-3GPP access. At step 602, the UE 204 loses the coverage of the 3GPP access. In such a scenario, the UE 204 may be in the 5GMM-Connected state with the 5GC 206b over the non-3GPP access and may not be reachable over the 3GPP access.

At step 603, the SMF 604 of the 5GC 206b in the 5GS 206 receives the communication service (for example herein: downlink (DL) data) that is to be delivered to the UE 204. The SMF 604 forwards the DL data pending to be delivered to the UE 204 to the AMF 602. At step 604, the AMF 602 sends the notification message to the UE 204 over the non-3GPP access.

In response to the received notification message, at step 605, the UE 204 indicates the AMF 602 about the failure to initiate the NAS procedure/signaling with the 5GC 206b over the 3GPP access, in order to receive the communication service over the 3GPP access. For indicating the AMF 602 about the failure to initiate the NAS message over the 3GPP access, at step 606, the UE 204 sends the notification response message to the AMF 602 over the non-3GPP access. In response to the received notification response message, at step 607, the AMF 602 communicates UE not reachable context to the SMF 604. The SMF 604 sets the "UE not reachable flag". Alternatively, in some implementations the AMF 602 and the SMF 604 start a timer which is implementation based time till which the UE 204 is considered as not reachable.

At step 608, the UE 204 triggers the registration procedure for receiving the communication services over the 3GPP access, when the UE 204 enters into the coverage of the 3GPP access. At step 609, the UE 204 sends the registration request message to the AMF 602 over the 3GPP access. In response to the received registration request message from the UE 204, at step 610, the AMF 602 sends the UE reachable context to the SMF 604. The SMF 604 deletes the "UE not reachable flag", which enables the UE 204 to receive the communication services over the 3GPP access as soon as the UE 204 enters in coverage area (i.e., when the UE 204 enters into the state 5GMM-REGISTERED.NORMAL-SERVICE).

Figure 7:
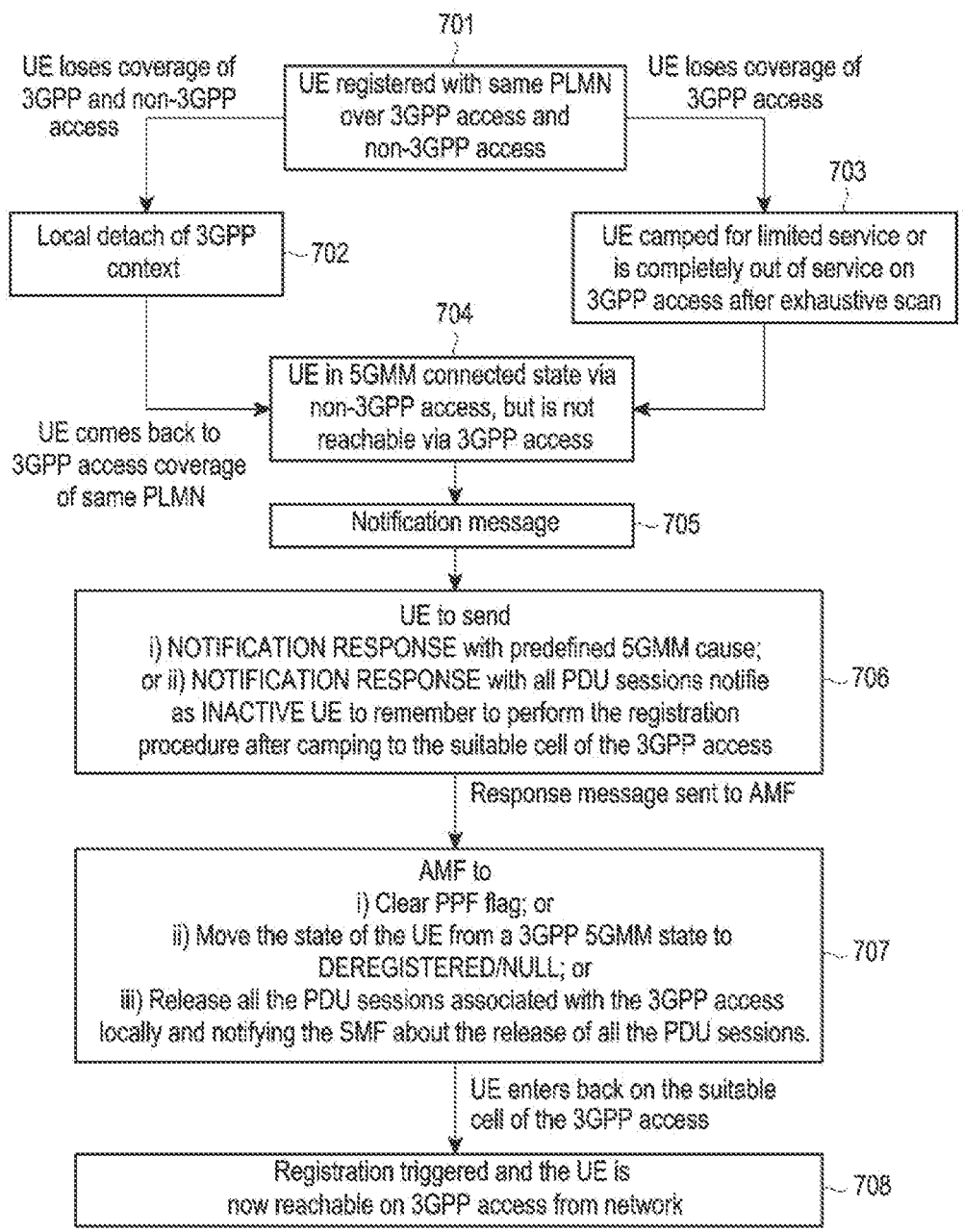
FIG. 7 is an example flow diagram depicting a process of the UE attempting to receive the communication services over a 3GPP access, when the UE is in a 5GMM connected state via a non-3GPP access and is not reachable via the 3GPP access, according to embodiments as disclosed herein.

FIG. 7 is an example flow diagram depicting a process of the UE 204 attempting to receive the communication services over the 3GPP access, when the UE 204 is in the 5GMM connected state via the non-3GPP access and is not reachable via the 3GPP access, according to embodiments as disclosed herein.

In an example herein consider that the UE 204 is registered with the same PLMN 202 over the 3GPP access and the non-3GPP access (step 701). If the UE 204 loses the coverage of the 3GPP access and the non-3GPP access, the UE 204 performs a local detach on the 3GPP context and enters into the coverage of the non-3GPP access of the same PLMN 202 (step 702). Further, consider that the UE 204 loses coverage of only the 3GPP access (at step 703), when the UE 204 camps for a limited service or is completely out of service on the 3GPP access, after an exhaustive scan. Thus, the UE 204 may be in the 5GMM connected state (with the 5GC 206b in the 5GS 206) via the non-3GPP access, however, the UE 204 is not reachable via the 3GPP access (step 704). In such a scenario, the AMF 602 may send the notification message to the UE 204 over the non-3GPP access (step 705) if the communication service is pending to be delivered to the UE 204.

In response to the received notification message, the UE 204 sends the notification response message to the AMF 602 (step 706). The notification response message indicates the AMF 602 about the failure of the UE 204 to initiate the NAS procedure over the 3GPP access. In an embodiment, the notification response message may include:
  NOTIFICATION RESPONSE with predefined 5GMM cause; or
  NOTIFICATION RESPONSE with all PDU sessions notified as INACTIVE UE to remember to perform the registration procedure after camping to the suitable cell of the 3GPP access.

In another embodiment, the notification response message may be replaced by any 5GMM message (for example: 5GMM Status Message, or the like). Alternatively, the 5GMM Status Message and the pre-defined 5GMM cause may be replaced by any other information element (IE).

In an embodiment, the UE 204 may send the NOTIFICATION RESPONSE with the predefined 5GMM cause or the NOTIFICATION RESPONSE with all the PDU sessions of 3GPP access notified as INACTIVE UE to the AMF 602 depending on at least one of, but is not limited to, a state of the UE 204, a substate of the UE 204, implementation criteria, and so on. In an example the implementation criteria may correspond to duration of coverage loss, or the like.

On receiving the response message from the UE 204, the AMF 602 performs at least one of the following actions (step 707):
  clearing a paging proceed flag (PPF) flag; or
  moving the state of the UE from the 5GMM-Connected state over the 3GPP access to DEREGISTERED/NULL; or
  releasing all the PDU sessions associated with the 3GPP access locally and notifying the SMF 604 about the release of all the PDU sessions.

Any of the above actions performed by the AMF 602 ensures that the AMF 602 does not attempt reaching the UE 204 via the 3GPP access for 5GSM activities (i.e., activities or services provided by the 5GS 206 including delivery of the communication services to the UE 204 over the 3GPP access) until the UE 204 triggers the registration procedure. The actions performed by the AMF 602 such as, clearing the PPF flag and moving the state of the LE from the 5GMM-Connected state over the 3GPP access to the DEREGISTERED/NULL may hold good for any other downlink signaling as well. The AMF 602 may try to reach the UE 204 for non-5GSM data/signaling activity, even after releasing all the PDU sessions associated with the 3GPP access locally.

When the UE 204 enters back on the suitable cell of the 3GPP access (i.e., when the UE 204 enters into the state 5GMM-REGISTERED.NORMAL-SERVICE), the UE 204 triggers the registration procedure by sending the registration request message to the AMF 602, which indicates the AMF 602 that the UE 204 is now reachable over the 3GPP access (step 708). On sending the NOTIFICATION RESPONSE with the predefined 5GMM cause to the AMF 602, the UE 204 may set a "5GS update status" to "Not Updated". Once the UE 204 enters into the coverage of the 3GPP access, the UE 204 triggers the registration procedure to inform the AMF 602 that the UE 204 is in the coverage of the 3GPP access. Alternatively, the UE 204 may include implementation-defined mechanisms/methods (instead of the "5GS update state") of learning that the registration procedure has to be triggered upon camping back onto the suitable cells of the 3GPP access.

Embodiments herein optimize a notification procedure in a 5G system, when a UE receives a notification message on a non-3GPP access, and when the UE is in a 5GMM-DEREGISTERED/5GMM-NULL or any other state/substate, where a Service Request may not be triggered over a 3GPP access.

Consider that the UE and the corresponding network behavior for the notification message received by the UE on the non-3GPP access when the UE is in the 5GMM-DEREGISTERED/5GMM-NULL or any other state/substate over the 3GPP access where the Service Request may not be triggered. In such a scenario, the UE sends a NOTIFICATION RESPONSE message with a pre-defined 5GMM cause to an AMF of a CN/5GC 206b. The 5GMM cause value may be "Message type not compatible with protocol state" or any other cause mutually decided by the UE and the 5GC. Also, instead of the 5GMM cause, any other IE may be used to notify the CN about the UE not being in a REGISTERED state or in general a state/sub-state combination that does not allow triggering the Service Request or a registration procedure. Also, instead of the notification response message, any other 5GMM message like 5GMM Status Message may be used to notify the network about the same information that NOTIFICATION RESPONSE is being used for.

On receiving the cause value, the AMF clears the PPF flag corresponding to the 3GPP access, by continuing running a mobile/UE reachable timer. Since the PPF flag is cleared, the AMF may not page the UE or send a NOTIFICATION message until the AMF receives a REGISTRATION request from the UE.

Whenever the UE has sent the NOTIFICATION RESPONSE with the 5GMM cause to the AMF, the UE sets a 5GS update status to 'Not Updated.' Once the UE comes back to the coverage of the 3GPP access, the UE performs a registration procedure to inform the AMF that the UE is back in coverage (i.e., the UE in a state 5GMM-REGISTERED). The UE in the state 5GMM-REGISTERED initiates the registration procedure for mobility and periodic registration update by sending a REGISTRATION REQUEST message to the AMF (i.e., 5GC), when the UE enters state 5GMM-REGISTERED.NORMAL-SERVICE over 3GPP access after the UE has sent a NOTIFICATION RESPONSE message over non-3GPP access in response to reception of a NOTIFICATION message over non-3GPP access indicating the UE that there is pending downlink communication service over the 3GPP access. Alternative NAS procedure may be triggered over the 3GPP access or the non-3GPP access with an indication that UE is now reachable over 3GPP access, with this indication the 5GC (AMF and all related SMF(s) and other core network entities) has to mark the respective UE as reachable and is available for both uplink and downlink communication services over 3GPP access.

Instead of the update status, the UE may also have implementation-defined mechanisms of remembering that the registration procedure is to be triggered upon camping back on a suitable cell of the 3GPP access.

In an embodiment, sending the notification response message by the UE 204 to the AMF in response to the received notification message enables the 5GC not to perform a paging of the UE until the UE comes back to the coverage of the 3GPP access and updates the 5GC/network via the registration procedure. Thus, the UE has to recall and ensure that the UE does the necessary registration procedure to receive the communication services by preventing the paging. In an embodiment, the UE may use the Service Request as an immediate trigger to notify the 5GC/network about that the UE is in the coverage of the 3GPP access.

Further, the cause value, previously used by the UE may differentiate between use cases, where the UE is in the DEREGISTERED/NULL states or in one of the sub-states of REGISTERED. Correspondingly, the AMF may also choose to move the 3GPP context of the UE to DEREGISTERED state (If the cause notifies the UE to be in DEREGISTERED/NULL states) or to set the PPF flag (If the cause implies that the UE is in one of the sub-states of REGISTERED). Additionally, within the use case of being in the REGISTERED state, whenever through the 5GS update status or other parameters, the UE is able to make out that the UE invariably has to perform the registration procedure upon camping back on the suitable cell, the UE uses the NOTIFICATION RESPONSE with the cause value that enables the AMF to clear the PPF flag. However, if the UE is in a state which might not always need a registration upon camping back on a suitable cell (camps back on a tracking area (TA) in a registered TA list), the UE may use a NOTIFICATION RESPONSE without including the cause value such that the AMF may not clear the PPF flag. Alternately if the UE is in the 5GMM-DEREGISTERED or 5GMM-NULL states, the UE may use the existing NOTIFICATION RESPONSE and set the status of all the PDU sessions to inactive in the PDU Session Status IE, which ensures that the PDU sessions are released and hence no further redundant paging/notification towards the UE may be performed.

The embodiments disclosed herein can be implemented through at least one software program running on at least one hardware device and performing network management functions to control the elements. The elements shown in FIGS. 2, 3, and 4 can be at least one of a hardware device, or a combination of hardware device and software module.

The embodiments disclosed herein describe methods and systems for to immediately acquire communication services. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in e.g. Very high speed integrated circuit hardware description language (VHDL) another programming language, or implemented by one or more VHDL or several software modules being executed on at least one hardware device. The hardware device can be any kind of portable device that can be programmed. The device may also include means which could be e.g. hardware means like e.g. an ASIC, or a combination of hardware and software means, e.g. an ASIC and an FPGA, or at least one microprocessor and at least one memory with software modules located therein. The method embodiments described herein could be implemented partly in hardware and partly in software. Alternatively, the invention may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein can be practiced with modification within the scope of the embodiments as described herein.

The invention claimed is:

1. A method performed by a user equipment (UE), the method comprising:
   registering with a third generation partnership project (3GPP) access and a non-3GPP access in a same public land mobile network (PLMN);
   receiving a notification message from a core network (CN) of the same PLMN over the non-3GPP access in case that the UE is in a connected mode over the non-3GPP access and at least one communication service is to be received by the UE over the 3GPP access;
   transmitting a notification response message to the CN over the non-3GPP access in response to the received notification message; and
   triggering a registration procedure with the CN over the 3GPP access in case that the UE enters 5GMM-REGISTERED.NORMAL-SERVICE over the 3GPP access after transmitting the notification response message to the CN over the non-3GPP access.

2. The method of claim 1, wherein the notification response message indicates a failure to initiate a non-access stratum (NAS) procedure over the 3GPP access.

3. The method of claim 1, wherein triggering the registration procedure with the CN comprises transmitting a registration request message to the CN over the 3GPP access.

4. The method of claim 3, wherein the registration request message indicates that the UE is in a coverage of the 3GPP access.

5. The method of claim 1, wherein the notification message is transmitted to the CN over the non-3GPP access in response to the received notification message, in case that the UE is in 5GMM-REGISTERED.NO-CELL-AVAILABLE state or 5GMM-REGISTERED.PLMN-SEARCH state.

6. A method performed by a core network (CN) of a public land mobile network (PLMN), the method comprising:
   transmitting a notification message to a user equipment (UE) over a non-third generation partnership project (3GPP) access in case that the UE is in a connected mode over the non-3GPP access and at least one communication service is to be delivered to the UE over a 3GPP access, wherein the UE is registered with the 3GPP access and the non-3GPP access in the PLMN;

receiving a notification response message from the UE over the non-3GPP access in response to the transmitted notification message; and receiving a registration request message from the UE over the 3GPP access in case that the UE enters 5GMM-REGISTERED.NORMAL-SERVICE over the 3GPP access after receiving the notification response message to the CN over the non-3GPP access.

7. The method of claim 6, wherein the notification response message indicates a failure to initiate a non-access stratum (NAS) procedure over the 3GPP access.

8. The method of claim 6, further comprising:
deleting a flag in case that the CN set the flag in response to receiving, from the UE, the registration request message; and
enabling the UE to receive the at least one communication service,
wherein the flag indicates that the UE is not reachable.

9. The method of claim 6, wherein the notification message is received from the UE over the non-3GPP access in response to the received notification message, in case that the UE is in 5GMM-REGISTERED.NO-CELL-AVAILABLE state or 5GMM-REGISTERED.PLMN-SEARCH state.

10. A user equipment (UE) in a wireless communication system, the UE comprising:
a transceiver; and
at least one processor connected to the transceiver and configured to:
register with a third generation partnership project (3GPP) access and a non-3GPP access in a same public land mobile network (PLMN),
receive a notification message from a core network (CN) of the same PLMN over the non-3GPP access in case that the UE is in a connected mode over the non-3GPP access and at least one communication service is to be received by the UE over the 3GPP access,
transmit a notification response message to the CN over the non-3GPP access in response to the received notification message, and
trigger a registration procedure with the CN over the 3GPP access in case that the UE enters 5GMM-REGISTERED.NORMAL-SERVICE over the 3GPP access after transmitting the notification response message to the CN over the non-3GPP access.

11. The UE of claim 10, wherein the notification response message indicates a failure to initiate a non-access stratum (NAS) procedure over the 3GPP access.

12. The UE of claim 10, wherein the registration procedure is triggered by transmitting a registration request message to the CN over the 3GPP access.

13. The UE of claim 12, wherein the registration request message indicates that the UE is in a coverage of the 3GPP access.

14. The UE of claim 10, wherein the notification message is transmitted to the CN over the non-3GPP access in response to the received notification message, in case that the UE is in 5GMM-REGISTERED.NO-CELL-AVAILABLE state or 5GMM-REGISTERED.PLMN-SEARCH state.

15. A core network (CN) of a public land mobile network (PLMN) in a wireless communication system, the CN comprising:
a transceiver; and
at least one processor connected to the transceiver and configured to:
transmit a notification message to a user equipment (UE) over a non-third generation partnership project (3GPP) access in case that the UE is in a connected mode over the non-3GPP access and at least one communication service is to be delivered to the UE over a 3GPP access, wherein the UE is registered with the 3GPP access and the non-3GPP access in the PLMN;
receive a notification response message from the UE over the non-3GPP access in response to the transmitted notification message; and
receive a registration request message from the UE over the 3GPP access in case that the UE enters 5GMM-REGISTERED.NORMAL-SERVICE over the 3GPP access after receiving the notification response message to the CN over the non-3GPP access.

16. The CN of claim 15, wherein the notification response message indicates a failure to initiate a non-access stratum (NAS) procedure over the 3GPP access.

17. The CN of claim 15, wherein the at least one processor is further configured to:
delete a flag in case that the CN set the flag in response to receiving, from the UE, the registration request message; and
enable the UE to receive the at least one communication service,
wherein the flag indicates that the UE is not reachable.

18. The CN of claim 15, wherein the notification message is received from the UE over the non-3GPP access in response to the received notification message, in case that the UE is in 5GMM-REGISTERED.NO-CELL-AVAILABLE state or 5GMM-REGISTERED.PLMN-SEARCH state.

* * * * *